(No Model.)
W. J. F. LIDDELL.
SAW MILL FEED MECHANISM.
No. 347,000. Patented Aug. 10, 1886.
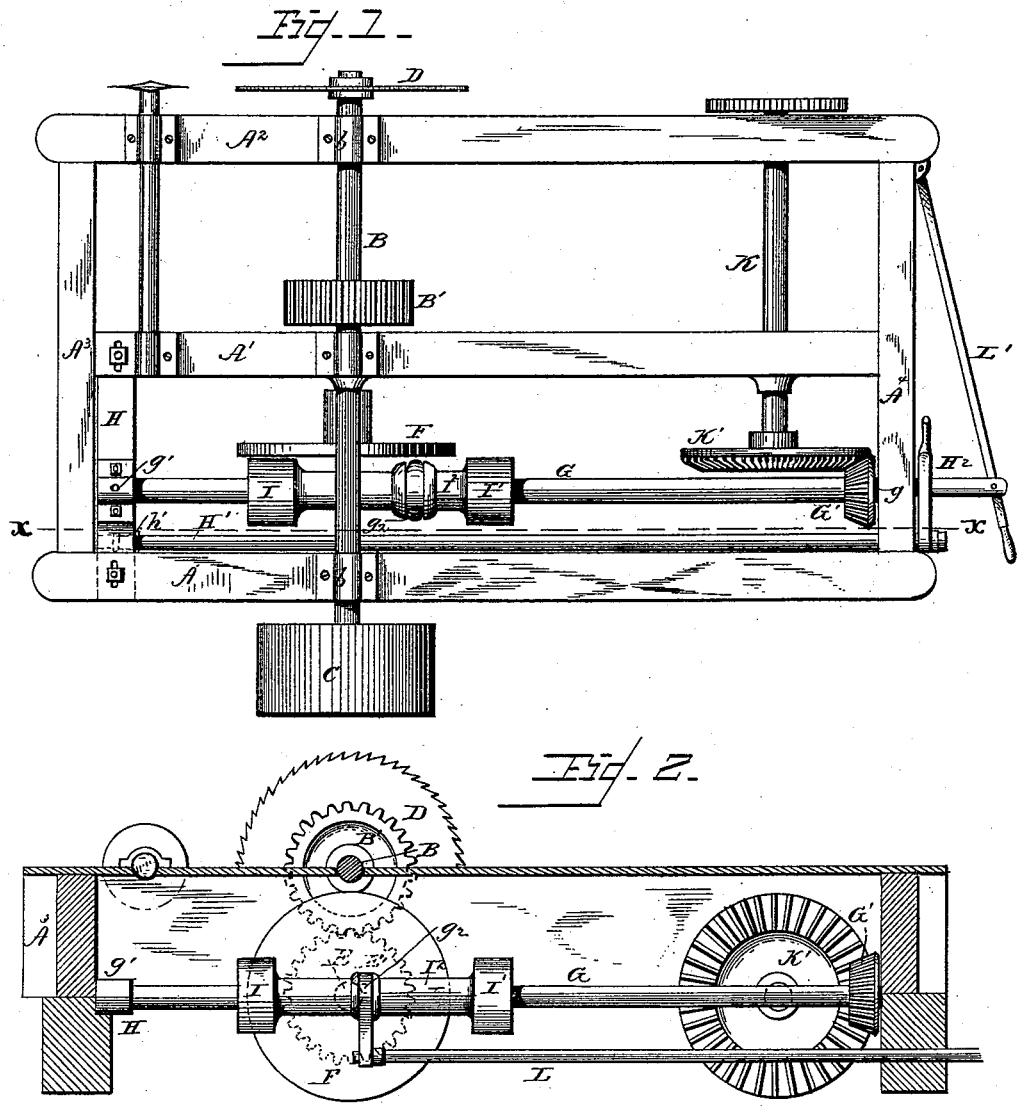
Witnesses.
Franck L. Ouraud.
Rex. M. Smith.
Inventor:
Walter J. F. Liddell.
By A. M. Smith
Attorney.

UNITED STATES PATENT OFFICE.

WALTER J. F. LIDDELL, OF CHARLOTTE, NORTH CAROLINA.

SAW-MILL FEED MECHANISM.

SPECIFICATION forming part of Letters Patent No. 347,000, dated August 10, 1886.

Application filed March 1, 1884. Serial No. 122,713. (No model.)

*To all whom it may concern:*

Be it known that I, WALTER J. F. LIDDELL, of Charlotte, county of Mecklenburg, State of North Carolina, have invented a new and useful Improvement in Saw-Mill Feed Mechanism, of which the following is a full, clear, and exact description, reference being had to the accompanying drawings, making part of this specification.

My invention relates to feed mechanism for saw-mills wherein the saw-carriage is connected with and driven from the mandrel by intermediate shafts geared together, and by a friction-disk secured to the end of one of the shafts, and a friction-wheel movable longitudinally upon its shaft to bear against the face of the disk, for varying and reversing the feed of the carriage.

The object of the first part of my invention is to arrange the shafts and gearing of the feed mechanism compactly within and below the framing for its protection and for the safety of the operator, and to secure a simple and effective combination of parts.

The object of the next part of my invention is to connect the disk-shaft with the shaft for driving the saw-carriage by a friction-wheel shaft supported in a simple, strong, and effective manner, to secure a forcible bearing of the friction-wheel upon the face of the disk without disengaging the beveled wheels connecting it with the saw-carriage-actuating shaft.

The object of the next part of my invention is to provide a simple arrangement of shafts geared together in combination with a disk secured to one of said shafts, and two friction-wheels coupled together to have a movement across the face of the disk at any required distance from the center of said disk, to secure a variable movement of the saw-carriage-actuating shaft, and also in combining said parts to secure a limited movement of the coupled friction-wheels.

In the accompanying drawings, Figure 1 is a plan view of the frame and feed mechanism; Fig. 2, a sectional longitudinal elevation in the line $x\ x$ of Fig. 1.

The main frame is provided with three longitudinal timbers, A A' A², and transverse end timbers, A³ A⁴. The saw-mandrel B is supported in bearings $b\ b$, secured to the longitudinal timbers, and carries a band-pulley, C, and a saw, D, secured to its ends in a well-known manner. A secondary shaft, E, is secured by bearings $e\ e$ to the under side of the longitudinal timbers A² A', and is arranged beneath and parallel to the saw-mandrel. A spur-gear, E', secured to the secondary shaft E, gears with and is driven by a similar wheel, B', secured to the saw-mandrel. The secondary shaft E extends only partly across the frame, and has a disk, F, secured to its end and arranged between the frame-timbers A A'. A friction-wheel shaft, G, is arranged longitudinally upon the frame between the timbers A A', and is supported at one end in a bearing, $g$, swiveled to the end timber, A⁴, and is supported at its other end in a bearing, $g'$, swiveled to a longitudinally-adjustable bearing-block, H, arranged transversely to the frame, alongside of the end timber A³. The bearing-block H is supported in straps bolted to the under sides of the frame-timbers A A', and is operated upon by a crank-arm, $h'$, secured to one end of a rock-shaft, H', supported in bearings upon the under side of the frame-timber A. The shaft H' extends along said timber to the opposite end of the frame, and is oscillated by a hand-lever, H², secured to it, by which means the longitudinal movement of the bearing-block and a vibrating movement of the friction-wheel shaft G are effected. Friction-wheels I I' are feathered to the shaft to move longitudinally thereon across the face of disk F, and a beveled pinion, G', secured to the end of shaft G near the frame-timber A⁴, engages with a beveled gear-wheel, K', secured to the end of a shaft, K, for actuating the saw-carriage in any well-known manner. It will be apparent that the end of shaft G, supported in the adjustable bearing-block H, may be moved an ample distance to release the friction-wheels I I' from contact with the disk F without effecting a disengagement of the beveled pinion G' from the beveled wheel K', and that its partial displacement will not endanger the breakage of the teeth of the gear-wheels, as they are relieved of strain when the shaft and friction-wheels are moved away from the face of the disk. The friction-wheels I I' are coupled together and form a solid piece with the sleeve I², and is of greater length than the diameter of the disk F, its length being such that when one of the wheels is bearing upon the outer edge of the disk the other wheel will be outside and clear of the opposite edge of the disk in such manner that the wheels cannot both be brought to bear upon the face of the disk at the same time. A limited movement of the coupled friction-wheels will bring either one or the other of said wheels to bear against the face of the disk to revolve the shaft in either direction. Either of the friction-wheels may be moved to any required distance from the center of the disk to vary the speed of the shaft in either direction. The friction-wheels are adjusted upon the shaft G by a collar, $g^2$, fitted loosely in a groove in the sleeve I², upon which the friction-wheels are secured, and a rod, L, supported in bearings secured to the frame and attached at its end to the collar $g^2$, may be moved longitudinally by means of a vibrating hand-lever, L', pivoted to the frame, to which the other end of the rod L is secured.

The shafts, gearing, and friction-disk of the feed mechanism are arranged upon a plane beneath the plane of the saw-mandrel, and are protected by the timbers of the frame, and may be covered over to be protected from the weather and from dirt and dust by a flooring secured to the upper side of the frame-timbers.

The operators may walk across the flooring without danger of being caught by the gearing, and the low-down arrangement of the saw-carriage feed-actuating shaft K will admit of its direct connection to a rack upon the under side of the saw-carriage, and said shaft K may be driven by a shaft arranged in a horizontal plane and connected with the saw-mandrel.

I claim as my invention and desire to secure by Letters Patent—

1. In a saw-mill-carriage feed mechanism, the combination, with the saw-mandrel, of a secondary shaft arranged beneath and parallel with said mandrel and geared directly thereto, as shown, a friction-disk secured to the end of said lower secondary shaft, and a friction-wheel feathered to and adjustable upon a shaft arranged at right angles to said secondary shaft and adjustable across the face of the said friction-disk, the friction-wheel shaft being connected by bevel-gears with the shaft actuating the saw-carriage, substantially as described.

2. In a saw-mill-carriage feed mechanism, the combination, with the saw-mandrel, of a secondary shaft arranged beneath and parallel with, geared directly to, and driven from, said mandrel, and provided at one end with a friction-disk, and a friction-wheel adjustable across the face of said disk and feathered to a shaft at right angles to the secondary shaft, said friction-wheel shaft being supported at one end in a longitudinally-adjustable bearing-block, and connected at its other end by bevel-gears with the saw-carriage-actuating shaft, substantially as and for the purpose described.

3. In a saw-mill feed mechanism, the combination, with the saw-mandrel, of the secondary shaft arranged parallel with, geared to, and driven from said mandrel, and provided at one end with a friction-disk, in combination with two friction-wheels located on the opposite sides of the axial center of said disk, and feathered to and adjustable on a shaft geared to and actuating the saw-carriage, for adapting either of said wheels to be moved into and out of frictional engagement with the face of the disk at any required distance from the axis thereof, for changing or varying the speed of the carriage in either direction, substantially as described.

4. In a saw-mill feed mechanism, the friction plate or disk geared to or actuated by the saw-mandrel, in combination with two rigidly-connected friction-wheels located on opposite sides of the axial center of said disk, and feathered to and adjustable on a shaft geared to and actuating the saw-carriage, whereby when either of said friction-wheels is moved within the periphery of said disk the other friction-wheel will be moved outside of said periphery, for the purpose set forth.

In testimony whereof I have hereunto set my hand this 23d day of February, A. D. 1884.

W. J. F. LIDDELL.

Witnesses:
J. L. CHAMBERS,
VINTON LIDDELL.